(12) United States Patent
Yang et al.

(10) Patent No.: US 11,994,328 B2
(45) Date of Patent: May 28, 2024

(54) ELECTRIC CONTROL ASSEMBLY AND AIR CONDITIONER (71) Applicant: GD MIDEA AIR-CONDITIONING EQUIPMENT CO., LTD., Guangdong (CN)

(72) Inventors: Jianning Yang, Guangdong (CN); Wenkai Zhang, Guangdong (CN); Wenjie Yi, Guangdong (CN)

(73) Assignee: GD MIDEA AIR-CONDITIONING EQUIPMENT CO., LTD., Guangdong (CN)

( * ) Notice: Subject to any disclaimer, the term of this patent is extended or adjusted under 35 U.S.C. 154(b) by 389 days.

(21) Appl. No.: 17/377,647

(22) Filed: Jul. 16, 2021

(65) Prior Publication Data

US 2021/0341200 A1    Nov. 4, 2021

Related U.S. Application Data (63) Continuation of application No. PCT/CN2019/088472, filed on May 27, 2019.

(30) Foreign Application Priority Data

Jan. 18, 2019    (CN) .......................... 201910051377.2

(51) Int. Cl.
    *H02P 5/74*       (2006.01)
    *F25B 49/02*      (2006.01)
    *H05K 1/02*      (2006.01)

(52) U.S. Cl.
    CPC .............. *F25B 49/025* (2013.01); *H02P 5/74* (2013.01); *F25B 2600/0253* (2013.01); *F25B 2600/11* (2013.01)

(58) Field of Classification Search
CPC ............ F25B 49/025; F25B 2600/0253; F25B 2600/11; H02P 5/74
(Continued)

(56) References Cited

U.S. PATENT DOCUMENTS

| 4,988,930 A | 1/1991 | Oberheide |
| 5,952,798 A | 9/1999 | Jones et al. |

(Continued)

FOREIGN PATENT DOCUMENTS

| CN | 201707731 U | 1/2011 |
| CN | 202713131 U | 1/2013 |

(Continued)

OTHER PUBLICATIONS

Yu et al. (CN 204559377 U) "Integrated Power Module And Air Conditioner" Date Published Aug. 12, 2015 (Year: 2015).*

(Continued)

*Primary Examiner* — Jorge L Carrasquillo
(74) *Attorney, Agent, or Firm* — Scully, Scott, Murphy & Presser, P.C.

(57) ABSTRACT

An electric control assembly for an air conditioner is provided. The assembly has an electric control board, a fan driving circuit and a compressor driving circuit. A ground end of the fan driving circuit and a ground end of the compressor driving circuit are connected with two reference grounds of the electric control board in one-to-one correspondence. The assembly also has a switch isolation driving circuit, a first input end of which is connected with a control end of the compressor driving circuit. A first output end of the switch isolation driving circuit is connected with a controlled end of the fan driving circuit. A second input end of the switch isolation driving circuit is connected with a control end of the fan driving circuit. A second output end (Continued)

of the switch isolation driving circuit is connected with a feedback end of the compressor driving circuit.

19 Claims, 5 Drawing Sheets

(58) Field of Classification Search
USPC .......................................................... 318/22
See application file for complete search history.

(56) References Cited

U.S. PATENT DOCUMENTS

| | | | |
|---|---|---|---|
| 9,225,169 B1 | 12/2015 | Fang | |
| 2017/0207763 A1* | 7/2017 | Li | ........................... H02P 27/06 |

FOREIGN PATENT DOCUMENTS

| | | | |
|---|---|---|---|
| CN | 202772899 U | 3/2013 | |
| CN | 203939743 U | 11/2014 | |
| CN | 104344499 A | 2/2015 | |
| CN | 204559377 U | 8/2015 | |
| CN | 105318648 A | 2/2016 | |
| CN | 206389350 U | 8/2017 | |
| CN | 108644986 A | 10/2018 | |
| CN | 208240660 U | 12/2018 | |
| CN | 208241587 U | 12/2018 | |
| CN | 208296199 U | 12/2018 | |
| CN | 109779892 A | 5/2019 | |
| JP | 2003106620 A | 4/2003 | |

OTHER PUBLICATIONS

He (CN 206389350 U) "An Optocoupler Isolation Communication Circuit" Date Published Aug. 8, 2017 (Year: 2017).*
Luo et al. (CN 202772899 U) "A Multimode Optical Fibre Transceiving Communication Circuit" Date Published Mar. 6, 2013 (Year: 2013).*
Nakashita et al. (WO 2013118574 A1) "Power Supply Control Device" Date Published Aug. 15, 2013 (Year: 2013).*
Gan et al. (CN 208296199 U) "Air Conditioner And Integrated Type Air Conditioner Controller" Date Published Dec. 28, 2018 (Year: 2018).*
Notice of Reasons for Refusal dated Oct. 4, 2022 received in Japanese Patent Application No. JP 2021-541137.
International Search Report and Written Opinion dated Oct. 9, 2019 received in International Application No. PCT/CN2019/088472 together with an English language translation.
First Office Action dated Jan. 21, 2020 received in Chinese Patent Application No. CN 201910051377.2 together with an English language translation.
Second Office Action dated Jul. 30, 2020 received in Chinese Patent Application No. CN 201910051377.2 together with an English language translation.
Supplementary European Search Report dated Feb. 4, 2022 received in European Patent Application No. EP 19910304.5.

* cited by examiner

ELECTRIC CONTROL ASSEMBLY AND AIR CONDITIONER

CROSS REFERENCE TO RELATED APPLICATIONS

The present application is a continuation application of PCT International Application No. PCT/CN2019/088472, filed on May 27, 2019, which claims priority to and benefits of the Chinese patent application No. 201910051377.2 filed on Jan. 18, 2019, entitled "Electric Control Assembly And Air Conditioner". The disclosure of the aforementioned applications is incorporated herein by reference for all purposes. No new matter has been introduced.

TECHNICAL FIELD

The present application relates to the technical field of electric control, in particular to an electric control assembly and an air conditioner.

BACKGROUND

In an outdoor unit of an air conditioner, fans and compressors are generally equipped, and corresponding motors are driven by a fan driver and a compressor driver. In order to realize signal isolation, it is usually necessary to arrange the compressor driver and the fan driver on two electric control boards respectively, and then communicate the compressor driver and the fan driver with each other.

This kind of electric control assembly, which is realized by two circuit boards, needs to be electrically connected through connectors, which makes assembly of the outdoor unit complicated and is not conducive to the stable use of the air conditioner.

SUMMARY

The main purpose of the present application is to provide an electric control assembly and an air conditioner, aiming at solving the problems of complex assembly, low power density and low reliability caused by the need to separate a compressor driver and a fan driver on two electric control boards.

To achieve the above object, the present application provides an electric control assembly including:
an electric control board provided with at least two reference grounds;
a fan driving circuit and a compressor driving circuit both configured on the electric control board, and a ground end of the fan driving circuit and a ground end of the compressor driving circuit are connected with two reference grounds of the electric control board in one-to-one correspondence;
a switch isolation driving circuit, where a first input end of the switch isolation driving circuit is connected with a control end of the compressor driving circuit, and a first output end of the switch isolation driving circuit is connected with a controlled end of the fan driving circuit, a second input end of the switch isolation driving circuit is connected with a control end of the fan driving circuit, and a second output end of the switch isolation driving circuit is connected with a feedback end of the compressor driving circuit;
where the fan driving circuit and the compressor driving circuit perform signal interaction through the switch isolation driving circuit.

Optionally, the electric control assembly further includes:
a direct current power supply configured on the electric control board and electrically connected with a power supply end of the fan driving circuit and a power supply end of the compressor driving circuit;
a power isolation circuit configured on the electric control board, where an input end of the power isolation circuit is connected with the direct current power supply, and two ground ends of the power isolation circuit are connected with the two reference grounds on the electric control board in one-to-one correspondence.

Optionally, the power isolation circuit includes a first capacitor, a second capacitor, a first inductor and a second inductor,
a first end of the first capacitor is connected to the power supply end of the compressor driving circuit and a first end of the first inductor, and a second end of the first capacitor is connected to one of the two reference grounds on the electric control board and a first end of the second inductor; and
a first end of the second capacitor is connected to the power supply end of the fan driving circuit and a second end of the first inductor, and a second end of the second capacitor is connected with another of the two reference grounds on the electric control board and a second end of the second inductor.

Optionally, the switch isolation driving circuit includes a first switch isolation branch, where an input end of the first switch isolation branch is the first input end of the switch isolation driving circuit, an output end of the first switch isolation branch is the first output end of the switch isolation driving circuit; and
a second switch isolation branch, where an input end of the second switch isolation branch is the second input end of the switch isolation driving circuit, and an output end of the second switch isolation branch is the second output end of the switch isolation driving circuit.

Optionally, the first switch isolation branch includes a first transistor, a third capacitor, a first resistor, and a second resistor, a first end of the first resistor is the input end of the first switch isolation branch and connected to a base of the first transistor, a collector of the first transistor is the output end of the first switch isolation branch and connected with the power supply end of the fan driving circuit through the second resistor, an emitter of the first transistor is connected with the ground end of the fan driving circuit; a first end of the third capacitor is connected to the collector of the first transistor, and a second end of the third capacitor is connected to the emitter of the first transistor.

Optionally, the first switch isolation branch further includes a first optocoupler, a third resistor, a fourth resistor and a fifth resistor, an anode of the first optocoupler is connected with the power supply end of the compressor driving circuit and a first end of the third resistor, a cathode of the first optocoupler is connected with a second end of the second resistor and the third resistor, a collector of the first optocoupler is connected with the power supply end of the fan driving circuit, and an emitter of the first optocoupler is connected with the controlled end of a fan driving circuit via the fourth resistor; the fifth resistor is connected in series between the emitter of the first optocoupler and the ground end of the fan driving circuit.

Optionally, the second switch isolation branch includes a second transistor, a fourth capacitor, a sixth resistor, and a seventh resistor, a first end of the sixth resistor is the input end of the second switch isolation branch and connected to a base of the second transistor, a collector of the second transistor is the output end of the second switch isolation branch and connected with the power supply end of the compressor driving circuit through the seventh resistor, and an emitter of the second transistor is connected with the ground end of the compressor driving circuit, a first end of the fourth capacitor is connected to the collector of the second transistor, and a second end of the fourth capacitor is connected to the collector of the second transistor.

Optionally, the second switch isolation branch further includes a second optocoupler, an eighth resistor, a ninth resistor and a tenth resistor, an anode of the second optocoupler is connected with the power supply end of the fan driving circuit and a first end of the eighth resistor, a cathode of the second optocoupler is connected with a second end of the eighth resistor and the seventh resistor, a collector of the second optocoupler is connected with the power supply end of the fan driving circuit, and an emitter of the second optocoupler is connected with the feedback end of the compressor driving circuit via the ninth resistor, the tenth resistor is connected in series between the collector of the second optocoupler and the power supply end of the compressor driving circuit.

Optionally, the electric control assembly further includes a fan failure protection circuit, a detection end of the fan failure protection circuit is connected to a fan, and an output end of the fan failure protection circuit is connected to the fan driving circuit.

Optionally, the electric control assembly also includes a compressor failure protection circuit, a detection end of the compressor failure protection circuit is connected with the fan, and an output end of the compressor failure protection circuit is connected with the compressor driving circuit.

Optionally, the electric control assembly further includes a main controller, a compressor IPM module and a fan IPM module, output ends of the main controller are respectively connected with the fan driving circuit and the compressor driving circuit, a driving end of the fan driving circuit is connected with the fan IPM module, and a driving end of the compressor driving circuit is connected with the compressor IPM module.

The present application also provides an air conditioner including an electric control assembly as described above. The electric control assembly includes an electronic control board. The electronic control board is provided with at least two reference grounds, a fan driving circuit and a compressor driving circuit both configured on the electric control board, and a ground end of the fan driving circuit and a ground end of the compressor driving circuit are connected with two reference grounds of the electric control board in one-to-one correspondence; a switch isolation driving circuit, where a first input end of the switch isolation driving circuit is connected with a control end of the compressor driving circuit, and a first output end of the switch isolation driving circuit is connected with a controlled end of the fan driving circuit, a second input end of the switch isolation driving circuit is connected with a control end of the fan driving circuit, and a second output end of the switch isolation driving circuit is connected with a feedback end of the compressor driving circuit; where the fan driving circuit and the compressor driving circuit perform signal interaction through the switch isolation driving circuit.

The electric control assembly of the present invention integrates a compressor driving circuit and a fan driving circuit on one electronic control board, and sets two reference grounds on the electronic control board. A ground end of the fan driving circuit and a ground end of the compressor driving circuit are respectively connected with the two reference grounds of the electronic control board one by one. A switch isolation driving circuit is configured between the compressor driving circuit and the fan driving circuit. The switch isolation driving circuit can respectively control on/off of the switch isolation driving circuit for signal interaction between the fan driving circuit and the compressor driving circuit. The electric control assembly of the present invention can still realize isolation of switching signals, harmonics and other interference signals between the fan driving circuit and the compressor driving circuit by integrating the compressor driving circuit and the fan driving circuit on one electronic control board, and without setting plug ends and wires, the plug points of the electronic control board can be reduced, and reliability of the electronic control board can be improved, thereby reducing the production cost of the air conditioner, reducing the maintenance rate of the air conditioner, and being beneficial to a stable use of the air conditioner. The present application solves the problem that because a compressor driving part and a fan driving part are needed to be separately configured on two electronic control boards, an assembly of electrical equipment is complicating and power density is low, and further when plugs and jumpers are used, it is necessary to increase plug-in points of the electronic control board and reliability is low.

BRIEF DESCRIPTION OF THE DRAWINGS

In order to more clearly explain the embodiments of the present application or the technical solutions in the art. The accompany drawings needed to be used in a description of the embodiments or related art will be briefly introduced, and it will be apparent that the accompanying drawings are only some embodiments of the present application, and to those of ordinary skill in the art, other drawings can also be obtained according to the structure shown in these drawings without creative work.

DESCRIPTION OF LABELS

| Label | Name |
| --- | --- |
| 100 | Electric control board |
| 10 | Compressor driving circuit |
| 20 | Fan driving circuit |
| 30 | Switch isolation driving circuit |
| 31 | First switch isolation branch |
| 32 | Second switch isolation branch |
| 40 | Power isolation circuit |
| 50 | Main controller |
| 60 | Compressor IPM module |
| 70 | Fan IPM module |
| 80 | Compressor failure protection circuit |
| 90 | Fan failure protection circuit |

-continued

| Label | Name |
|---|---|
| Q1 | First transistor |
| Q2 | Second transistor |
| C1~C4 | First Capacitor~Fourth Capacitor |
| R1~R4 | First resistor~Fourth resistor |
| L1 | First inductor |
| L2 | Second inductor |
| VCC | DC power supply |

The realization, functional features and advantages of the present application will be further explained with reference to the accompanying drawings in connection with the embodiments.

DETAILED DESCRIPTION OF THE EMBODIMENTS

The technical aspects of the embodiments of the present application will be described clearly and completely in conjunction with the accompanying drawings of the embodiments of the present application. It is obvious that the described embodiments are only some of the embodiments of the present application, and not all of the embodiments. Based on the embodiments in the present application, all other embodiments obtained by those of ordinary skill in the art without creative work fall within the scope of the present application.

It should be noted that if there are directional indications (such as up, down, left, right, front, rear, etc.) in the embodiments of the present application, the directional indications are only for explaining relative positional relationship, movement situation, etc. between members under a certain posture (as shown in the drawings). If the specific posture changes, the directional indication will also be changed accordingly.

In addition, if there are descriptions relating to "first", "second" and the like in embodiments of the present application, the descriptions of "first", "second" and the like are only configured for descriptive purposes and cannot be understood as indicating or implying their relative importance or implying the number of indicated technical features. Thus, a feature defined as "first" and "second" may explicitly or implicitly include at least one such feature. In addition, the technical solutions between various embodiments can be combined with each other, but it must be based on the realization of one of ordinary skill in the art. When the combination of technical solutions is contradictory or impossible to be realized, it should be considered that such combination of technical solutions does not exist and is not within the scope claimed by the present application.

The present application provides an electric control assembly, which is adaptive for electrical equipment, such as frequency conversion air conditioners, frequency conversion washing machines, frequency conversion refrigerators, etc., and can be suitable for being configured in integrated air conditioners such as mobile air conditioners, window air conditioners, dehumidifiers and humidifiers, and especially suitable for being configured in multi-split air conditioners. For better understanding, the electric control assembly being configured in an air conditioner is taken as an example in all the examples.

Figure 1:
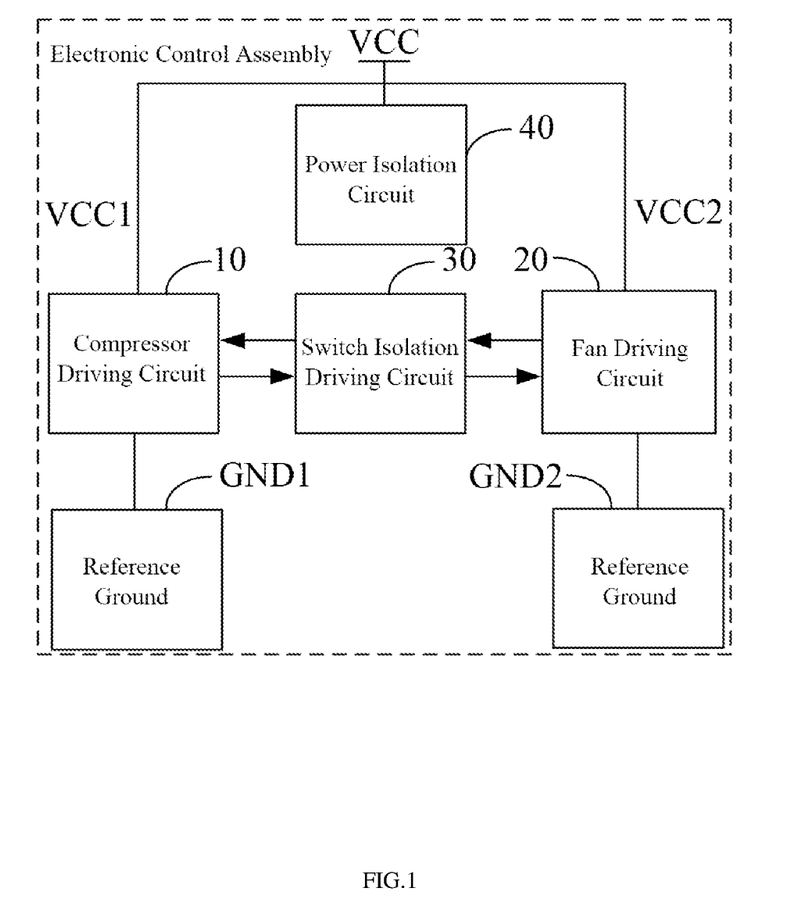
FIG. 1 is a schematic diagram of functional modules of an electric control assembly according to an embodiment of the present application.

Referring to FIG. 1, in an embodiment of the present application, the electric control assembly includes:
an electric control board provided with at least two reference grounds (GND1, GND2);
a compressor driving circuit 10 and a fan driving circuit 20, where the fan driving circuit 20 and the compressor driving circuit 10 are configured on the electric control board, and a ground end of the fan driving circuit 20 and a ground end of the compressor driving circuit 10 are connected to the two reference ground of the electric control board in one-to-one correspondence;
a switch isolation driving circuit 30 having a first input end connected to a control end of the compressor driving circuit 10, a first output end of the switch isolation driving circuit 30 connected to a controlled end of the fan driving circuit 20, a second input end connected to a control end of the fan driving circuit 20, and a second output end connected to a feedback end of the compressor driving circuit 10.

The fan driving circuit 20 and the compressor driving circuit 10 perform signal interaction through the switch isolation driving circuit 30.

The electric control assembly of this embodiment is suitably configured in an outdoor unit of an air conditioner, and the electric control board can be realized by a single panel or a double panel, and can be specifically set according to installation space and an installation position of an actually applied electrical equipment. The electric control board is also provided with a power input interface (AC-L, AC-N) configured to receive an AC power supply and a communication interface (not shown) configured to communicate with an external device, such as an indoor unit of the air conditioner. The electric control board is provided with two reference grounds corresponding to the fan driving circuit 20 and the compressor driving circuit 10 respectively, and a ground end of the fan driving circuit 20 and a ground end of the compressor driving circuit 10 are connected with the two reference grounds one by one. With this arrangement, the fan driving circuit 20 and the compressor driving circuit 10 have independent grounding points, and interference signals generated by the fan driving circuit 20 will not be transmitted to the compressor driving circuit 10 through a ground wire, and interference signals generated by the compressor driving circuit 10 will not be transmitted to the fan driving circuit 20 through the ground wire.

The electric control board is also provided with a main controller 50 for performing data processing, and the main control 50 is connected to the compressor driving circuit 10 and the fan driving circuit 20. The main control 50 is integrated with a timing control, a memory, a data processor, and software programs and/or modules stored in the memory and executable by the data processor. The main controller 50 executes the software programs and/or modules stored in memory, calls the data stored in the memory, and communicates with a controller of the indoor unit through the communication interface, so as to convert control signals sent by the controller to corresponding driving signals, to control the fan driving circuit 20 and the compressor driving circuit 10 to operate. The main controller 50 can be a microprocessor, such as a single chip micro-controller or a DSP.

The fan driving circuit 20 and the compressor driving circuit 10 are communicated through the switch isolation driving circuit 30. Specifically, a rotational speed is set by the compressor driving circuit 10 to the fan driving circuit 20 through the switch isolation driving circuit 30, and a rotational speed can be fed back by the fan driving circuit 20 to the compressor driving circuit 10 through the switch isolation driving circuit 30. At the same time, the fan driving circuit 20 and the compressor driving circuit 10 may send failure information to each other through the switch isolation driving circuit 30. For example, when the fan driving circuit 20 detects a failure, such as an over-current or an over-voltage of a fan, a failure detection signal can be transmitted to the compressor driving circuit 10 via the switch isolation driving circuit 30 to control the compressor to stop operation or reduce the rotational speed of a compressor. Similarly, when the compressor driving circuit 10 detects a failure, such as an over-current or over-voltage of the compressor, a failure detection signal can be transmitted to the fan driving circuit 20 via the switch isolation driving circuit 30 to control the fan to stop operation or reduce the rotational speed of the fan. The compressor driving circuit 10 controls on/off of the first output end and the first input end of the switch isolation driving circuit 30, so as to send communication signals, such as set rotational speed and compressor failure, to the fan driving circuit 20. The fan driving circuit 20 controls on/off of the second output end and the second input end of the switch isolation driving circuit 30, so as to send communication signals, such as rotational speed feedback and fan failure, to the fan driving circuit 20.

Generally, the electric control board is also provided with a rectifier circuit, which can be a rectifier bridge stack or can be realized by adopting a rectifier circuit composed of four independent diodes. The rectifier circuit converts the received AC power supply into DC power and transmits the DC power to a power factor correction circuit for power factor adjustment. The fan driving circuit 20 and the compressor driving circuit 10 are optionally implemented using an integrated IC, and the fan driving circuit 20 is configured to drive an intelligent power module (IPM) of the fan. The fan driving circuit 20 can drive one fan IPM module 70 to operate, or drive two fan IPM modules 70 to operate at the same time, which can be specifically set according to a type of the air conditioner. In a multi-split air conditioner, the fan driving circuit 20 can optionally drive two fan IPM modules 70 to operate at the same time. The compressor driving circuit 10 is configured to drive an IPM module 60 of the compressor.

The fan IPM module 70 is configured to drive a motor of a wind wheel to operate, and the compressor IPM module 60 is configured to drive a motor of the compressor to operate, so as to drive the compressor or the wind wheel to operate by the motor. In other embodiments, an IPM module can also be configured to drive a frequency converter having another motor and various inverter power supplies, and should be configured in fields of frequency conversion speed regulation, metallurgical machinery, electric traction, servo drive, frequency conversion household appliances such as air conditioning, and so on.

It should be noted that the compressor IPM module 60 and the fan IPM module 70 are generally integrated with power switch tubes, and those power switch tubes can be turned on/off quickly during operation, thereby easily generating high frequencies dV/dt and di/dt, causing EMC interference signals of the electric control board. Those switching signals, harmonics and other interference signals are easily introduced to other circuits and devices through a circuit routing layer or a ground wire on the electric control board, and affects the EMC performance of the whole machine.

Therefore, it is usually necessary to arrange the compressor driving part and the fan driving part on two electric control boards, and then connect them for communication, as such complex information cannot be transmitted. When the compressor driving part and the fan driving part are placed on two electric control boards, plugs and jumpers are also needed to realize an electric connection between the compressor driving part and the fan driving part. The electric control boards with this structure will have more components and the circuit structure is not compact, resulting in complex assembly of the outdoor unit and low power density. When plugs and jumpers are used, plug points of the electric control board will be increased, with low reliability. At the same time, the production cost of the air conditioner will be increased, and a maintenance rate will also be increased, which is not conducive to a stable use of the air conditioner.

In order to solve the above problems, in certain embodiment of the present application, the compressor driving circuit 10 and the fan driving circuit 20 are integrated on one electric control board. The ground end of the fan driving circuit 20 and the ground end of the compressor driving circuit 10 are respectively connected with the two reference grounds of the electric control board in one-to-one correspondence, so that the compressor driving circuit 10 and the fan driving circuit 20 have independent grounding points. The present application further provides a switch isolation driving circuit 30 between the compressor driving circuit 10 and the fan driving circuit 20. The switch isolation driving circuit 30 can perform signal interaction between the fan driving circuit 20 and the compressor driving circuit 10 by controlling on/off of the switch isolation driving circuit 30 respectively. The electric control assembly of the present application integrates the compressor driving circuit 10 and the fan driving circuit 20 on one electric control board, it is also possible to isolate interference signals such as switching signals and harmonics between the fan driving circuit 20 and the compressor driving circuit 10. In addition, there is no need to set plugs and wires, so that the plug points of the electric control board can be reduced, and reliability of the electric control board can be improved, thereby reducing a production cost of the air conditioner and a maintenance rate of the air conditioner, and being beneficial to a stable use of the air conditioner. The present application solves the problems that the compressor driving part and the fan driving part are needed to be separately configured on two electric control boards, resulting in complex assembly of the electrical equipment, low power density, and low reliability due to the need to increase the plug points of the electric control board when the plugs and jumpers are adopted.

Figure 3:
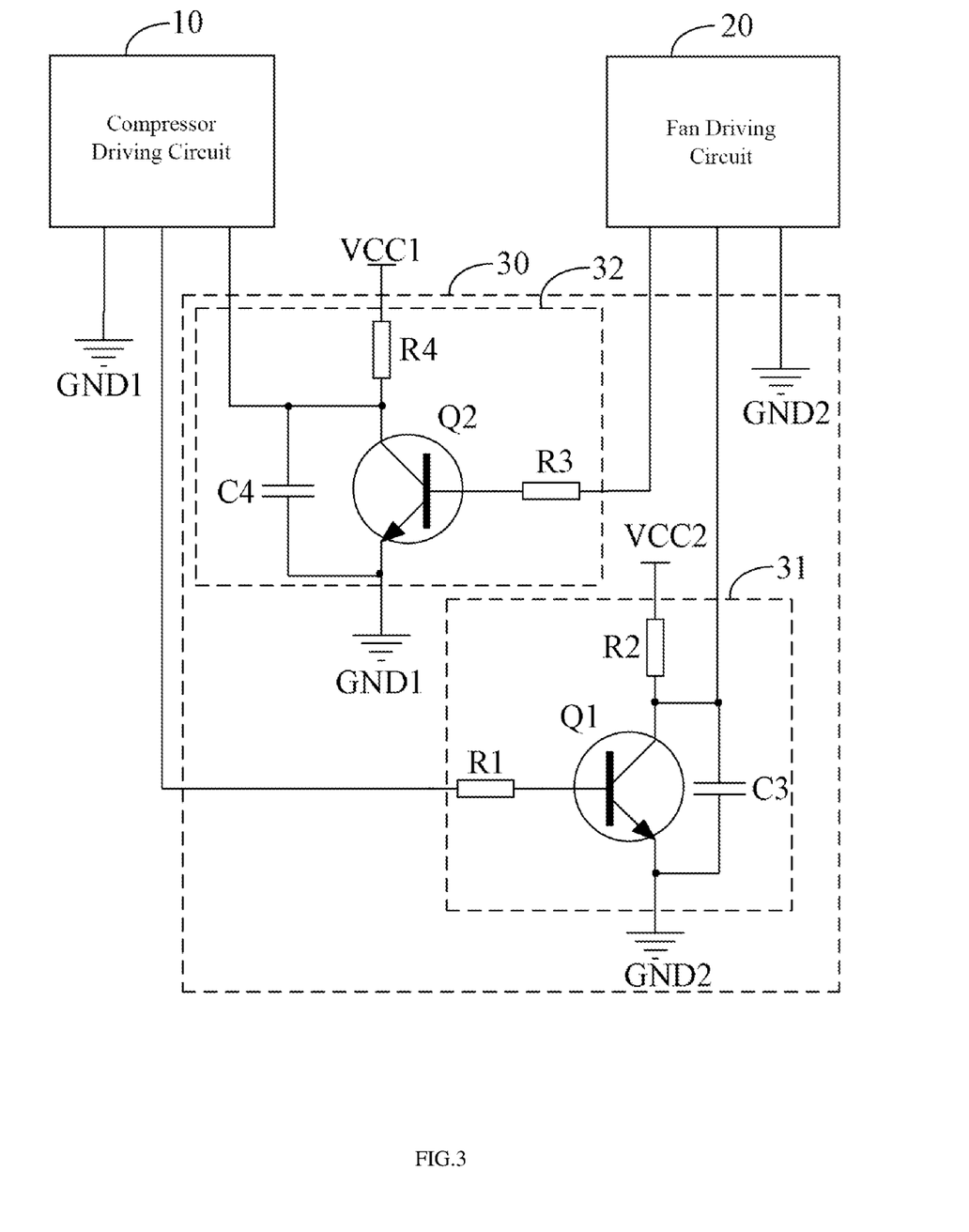
FIG. 3 is a schematic circuit diagram of an embodiment of the electric control assembly of the present application.

Referring to FIG. 1 or FIG. 3, in one embodiment, the electric control assembly further includes:

a DC power supply VCC configured on the electric control board and electrically connected with a power supply end VCC2 of the fan driving circuit 20 and a power supply end VCC1 of the compressor driving circuit 10 respectively;

a power isolation circuit 40 configured on the electric control board, where an input end of the power isolation circuit 40 is connected with the DC power supply VCC, and two ground ends of the power isolation circuit 40 are connected with the two reference grounds on the electric control board in one-to-one correspondence.

In this embodiment, the DC power supply VCC can be an independent DC current source or a DC conversion circuit that converts a received AC power into DC power. The present application may optionally be implemented with a DC conversion circuit. In some embodiments, the DC conversion circuit includes a rectifier bridge, a power filter circuit and a power factor correction circuit. An input end of the rectifier bridge is connected with an AC power supply. An output end of the rectifier bridge is respectively connected with an input end of the power factor correction circuit and the power filter circuit, and an output end of the power factor correction circuit is connected with a dimming signal output end. The power factor correction circuit is configured to perform power factor correction on the DC power supply VCC from the rectifier bridge and then output the DC power supply VCC.

In this embodiment, the rectifier bridge can be a rectifier bridge stack or a rectifier bridge composed of four independent diodes. The rectifier bridge converts the received AC power supply into DC power and then output the DC power.

The filter circuit can be realized by inductors and capacitors, and the filter circuit is configured to filter out high frequency noise in the DC power.

A DC-DC step-down circuit can convert the received DC power to the power supplies of the main controller 50, the fan driving circuit 20, and the compressor driving circuit 10 and the like circuit modules. In this embodiment, the DC-DC step-down circuit can step down to generate voltages of 12V, 5V, 3.3V and the like for different circuit modules to operate. In particular, the DC-DC step-down circuit can be realized by a step-down chip.

In some embodiments, the DC power supply VCC also includes a power factor correction (PFC) circuit, which may be implemented using a passive power factor correction circuit or an active power factor correction circuit, and the power factor correction circuit may be a step-up type power factor correction circuit, a step-down type power factor correction circuit, or a step-up step-down type power factor correction circuit.

A controlled end of the power factor correction circuit is connected to a control end of the main controller 50. Based on the control of the main controller 50, the power factor correction circuit adjusts a power factor of the input DC power, for example, boosts the DC voltage and stabilizes the boosted DC voltage near a set value, so that the input current follows the input voltage and ensures that the power factor of the DC power supply VCC is above 0.9. The adjusted DC power is transmitted to a DC bus capacitor, filtered by the DC bus capacitor and then transmitted to the compressor IPM module 60 or the fan IPM module 70. The power factor correction circuit of this embodiment can be realized by adopting a three-phase parallel power factor correction circuit, so that when a compressor motor and two fan motors are configured in an outdoor unit of the air conditioner, three direct currents are output to drive different motors to operate.

The power isolation circuit 40 is configured to isolate the interference signals from the fan driving circuit 20 to the compressor driving circuit 10 via the power source ends, or to isolate the interference signals output from the compressor driving circuit 10 to the fan driving circuit 20 via the power source ends, or to isolate the interference signals from the DC power source VCC.

Figure 2:
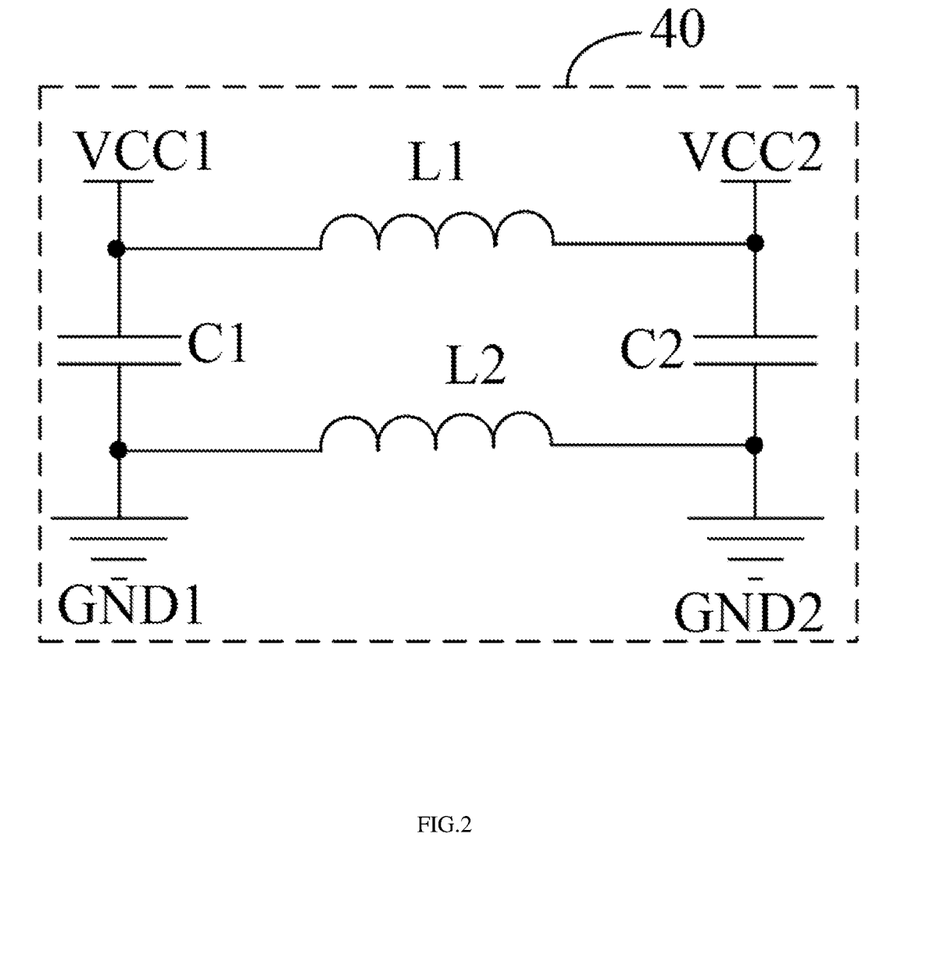
FIG. 2 is a schematic circuit diagram of an embodiment of a power isolation circuit of FIG. 1.

Referring to FIG. 2, in one embodiment, the power isolation circuit 40 includes a first capacitor C1, a second capacitor C2 a first inductor L1 and a second inductor L2. A first end of the first capacitor C1 is connected to the power supply end VCC1 of the compressor driving circuit 10 and a first end of the first inductor L1, and a second end of the first capacitor C1 is connected to the reference ground GND1 on the electric control board and a first end of the second inductor L2. A first end of the second capacitor C2 is connected to the power supply end VCC2 of the fan driving circuit 20 and a second end of the first inductor L1, and a second end of the second capacitor C2 is connected to another reference ground GND2 on the electric control board and a second end of the second inductor L2.

In this embodiment, the power isolation circuit 40 uses the first capacitor C1, the second capacitor C2, the first inductor L1, and the second inductor L2 to form two sets of LC filter circuits, thereby preventing the interference signals generated by the fan driving circuit 20 from being transmitted to the compressor driving circuit 10 via the power supply ends, or preventing the interference signals generated by the compressor driving circuit 10 output to the fan driving circuit 20 via the power supply ends, or filtering out the interference signals in the DC power supply VCC.

Referring to FIG. 1 and FIG. 3, in one embodiment, the switch isolation driving circuit 30 includes a first switch isolation branch 31 and a second switch isolation branch 32, an input end of the first switch isolation branch 31 is the first input end of the switch isolation driving circuit 30, and an output end of the first switch isolation branch 31 is the first output end of the switch isolation driving circuit 30.

An input end of the second switch isolation branch 32 is the second input end of the switch isolation driving circuit 30, and an output end of the second switch isolation branch 32 is the second output end of the switch isolation driving circuit 30.

In this embodiment, the first switch isolation branch 31 is turned on/off under control of the compressor driving circuit 10, thereby realizing a connection between the compressor driving circuit 10 and the fan driving circuit 20 for communication, and sending communication signals to the fan driving circuit 20, such as a set rotational speed and a compressor failure. The second switch isolation branch 32 is turned on/off under control of the fan driving circuit 20, thereby realizing the connection between the fan driving circuit 20 and the compressor driving circuit 10 for communication, and sending rotational speed feedback, fan failure and other communication signals to the fan driving circuit 20.

Referring to FIG. 1 and FIG. 3, in one embodiment, the first switch isolation branch 31 includes a first transistor Q1, a third capacitor C3, a first resistor R1 and a second resistor R2. A first end of the first resistor R1 is an input end of the first switch isolation branch 31, and the first end of the first resistor R1 is connected to a base of the first transistor Q1. A collector of the first transistor Q1 is connected to the power supply end VCC2 of the fan driving circuit 20 via the second resistor R2, and an emitter of the first transistor Q1 is connected to the ground end of the fan driving circuit 20. A first end of the third capacitor C3 is connected to the collector of the first transistor Q1, and a second end of the third capacitor C3 is connected to the emitter of the first transistor Q1.

In this embodiment, the collector of the first transistor Q1 is the output end of the first switch isolation branch 31, the first transistor Q1 is controlled by the compressor driving circuit 10 and is turned on/off under the control of the compressor driving circuit 10. When the first transistor Q1 is turned on, the compressor driving circuit 10 and the fan driving circuit 20 are connected and communicated, and communication signals, such as the set rotational speed and the compressor failure, are sent to the fan driving circuit 20. It can be understood that the first transistor Q1 is a current driving device, and its on/off is only affected by a current magnitude, and not by a voltage. Therefore, the interference signals at the fan driving circuit 20 side will not enter the compressor driving circuit 10, thus realizing an input/output isolation of the communication signals. The third capacitor C3 is a filtering capacitor, which can filter out noises in the communication signals. The first resistor R1 is a current limiting resistor configured to avoid damaging the transistor due to excessive current supplied to the base of the transistor. The second resistor R2, which is a pull-up resistor, is configured to output a driving signal of high level to the fan driving circuit 20 when the first transistor Q1 is turned off, and can also improve sensitivity of the fan driving circuit 20 to the output communication signals.

Figure 4:
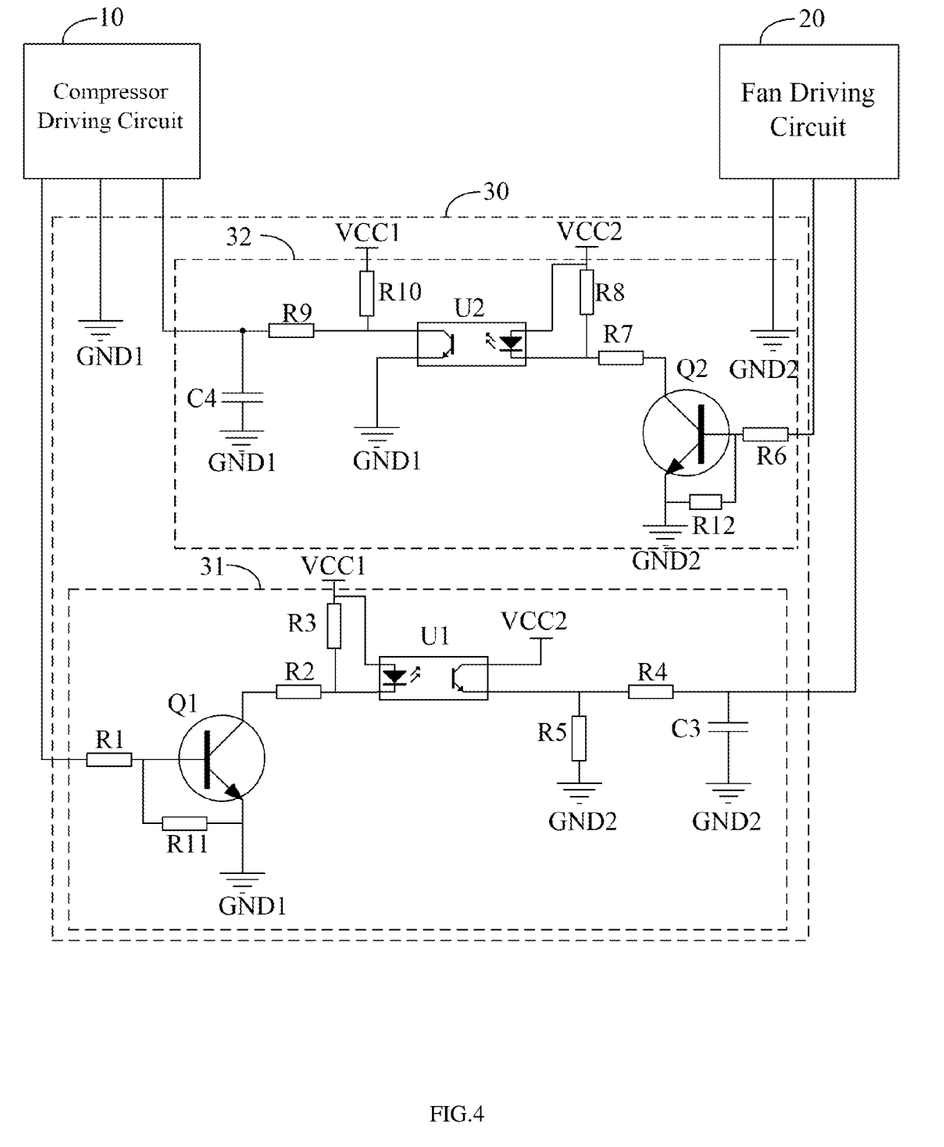
FIG. 4 is a schematic circuit diagram of another embodiment of the electric control assembly of the present application.

Referring to FIG. 1 and FIG. 4, in one embodiment, the first switch isolation branch 31 further includes a first optocoupler U1, a third resistor R3, a fourth resistor R4 and a fifth resistor R5. An anode of the first optocoupler U1 is connected with the power supply end of the compressor driving circuit 10 and a first end of the third resistor R3. A cathode of the first optocoupler U1 is connected with the second resistor and a second end of the third resistor R3. A collector of the first optocoupler U1 is connected with the power supply end of the fan driving circuit 20, and an emitter of the first optocoupler U1 is connected with the controlled end of the fan driving circuit 20 via the fourth resistor R4. The fifth resistor R5 is connected in series between the emitter of the first optocoupler U1 and the ground end of the fan driving circuit 20.

In this embodiment, the first optocoupler U1 can be provided between the first transistor Q1 and the controlled end of the fan driving circuit 20, so that communication signal isolation between the compressor driving circuit 10 and the fan driving circuit 20 can be further realized. An emitter of the first transistor Q1 is connected to the ground end of the compressor driving circuit 10, i.e., there is a common ground connection between the first transistor Q1 and the compressor driving circuit 10, and the collector of the first transistor Q1 is connected to the power supply end of the compressor driving circuit 10. The connection relationships between the first transistor Q1 and the fan driving circuit 20 and the compressor driving circuit 10 can be adjusted according to presence or absence of the optocoupler. Based on the control of the first transistor Q1, the first optocoupler U1 is turned on when the first transistor Q1 is turned on, and communication signals, such as the set rotational speed and the compressor failure, are sent to the fan driving circuit 20. In some embodiments, a unidirectional conduction element such as a diode may also be provided between the first transistor Q1 and the controlled end of the fan driving circuit 20 to realize an input/output isolation of the communication signals. The first switch isolation branch 31 also includes an eleventh resistor R11, which is connected in parallel between the base and the emitter of the first transistor Q1.

Referring to FIG. 1 and FIG. 4, in one embodiment, the second switch isolation branch 32 includes a second transistor Q2, a fourth capacitor C4, a sixth resistor R6, and a seventh resistor R7. A first end of the sixth resistor R6 is the input end of the second switch isolation branch 32, and the first end of the sixth resistor R6 is connected to a base of the second transistor Q2. A collector of the second transistor Q2 is connected to the power supply end VCC1 of the compressor driving circuit 1 0 via the seventh resistor R7. An emitter of the second transistor Q2 is connected to the ground end of the compressor driving circuit 10. A first end of the fourth capacitor C4 is connected to the collector of the second transistor Q2, and a second end of the fourth capacitor C4 is connected to the emitter of the second transistor Q2.

In this embodiment, the collector of the second transistor Q2 is the output end of the second switch isolation branch 32. The second transistor Q2 is controlled by the compressor driving circuit 10 and is turned on/off under the control of the compressor driving circuit 10. When the second transistor Q2 is turned on, the compressor driving circuit 10 and the fan driving circuit 20 are connected and communicated, and communication signals, such as the set rotational speed and the compressor failure, are sent to the fan driving circuit 20. It can be understood that the second transistor Q2 is a current driving device, and on or off of the second transistor Q2 is only affected by a current magnitude, not by a voltage. Therefore, the interference signals at the compressor driving circuit 10 side will not enter the fan driving circuit 20, thus realizing an input/output isolation of the communication signals. In particular, the fourth capacitor C4 is a filtering capacitor, which can filter out noises in the communication signals. The sixth resistor R6 is a current limiting resistor configured to avoid damaging the transistor due to excessive current output to the base of the transistor. The seventh resistor R7 is a pull-up resistor and is configured to output a driving signal of high level to the compressor driving circuit 10 when the second transistor Q2 is turned off, and can also improve sensitivity of the compressor driving circuit 10 to the output communication signals.

Referring to FIG. 1 and FIG. 4, in one embodiment, the second switch isolation branch 32 further includes a second optocoupler U2, an eighth resistor R8, a ninth resistor R9, and a tenth resistor R10. An anode of the second optocoupler U2 is connected with the power supply end of the fan driving circuit and a first end of the eighth resistor R8. A cathode of the second optocoupler U2 is connected with the seventh resistor R7 and a second end of the eighth resistor R8. A collector of the second optocoupler U2 is connected to the power supply end of the compressor driving circuit 10. An emitter of the second optocoupler U2 is connected to the controlled end of the compressor driving circuit 10 via the ninth resistor R9. The tenth resistor R10 is connected in series between the collector of the second optocoupler U2 and the power supply end of the compressor driving circuit 10.

In this embodiment, a second optocoupler U2 can be provided between the second transistor Q2 and the controlled end of the fan driving circuit 20, so that communication signals isolation between the compressor driving circuit 10 and the fan driving circuit 20 can be further realized. The emitter of the second transistor Q2 is connected to the ground end of the compressor driving circuit 10. That is, there is a common ground connection between the second transistor Q2 and the compressor driving circuit 10, and the collector of the second transistor Q2 is connected to the power supply end of the compressor driving circuit 10. In the second switch isolation branch 32, the connection relationships between the second transistor Q2 and the fan driving circuit and the compressor driving circuit 10 can be adjusted according to presence or absence of the optocoupler. The second optocoupler U2 is turned on when the second transistor Q2 is turned on based on the control of the second transistor Q2, and feeds back the communication signals such as the rotational speed and the fan failure to the fan driving circuit 20. In some embodiments, a unidirectional conduction element such as a diode can also be provided between the second transistor Q2 and the controlled end of the fan driving circuit 20 to realize an input/output isolation of the communication signals. The second switch isolation branch 32 further includes a twelfth resistor R12 connected in parallel between the base and emitter of the second transistor Q2.

Referring to FIG. 4, in one embodiment, the electric control assembly further includes a compressor failure protection circuit 80, a detection end of the compressor failure protection circuit 80 is connected to the fan, and an output end of the compressor failure protection circuit 80 is connected to the compressor driving circuit 10.

In this embodiment, the compressor failure protection circuit 80 can be integrated into the compressor IPM module 60 or the compressor driving circuit 10, or electronic components such as a current sensor, a resistor, a comparator, etc. may be used to realize over-current protection for the compressor. The compressor failure protection circuit 80 can judge whether over-current of the motor of the compressor occurs by detecting an output current of the compressor, so that the compressor driving circuit 10 drives the fan to operate according to an over-current protection signal from the compressor failure protection circuit 80. The compressor driving circuit 10 can also output a compressor failure signal to the fan driving circuit 20 when the compressor failure protection circuit 80 output the over-current protection signal, so that the fan driving circuit 20 controls a working state of the fan according to the compressor failure signal.

In the above embodiments, the compressor failure protection circuit 80 can also implement over-voltage protection of the compressor by detecting a DC bus voltage, and implement over-temperature protection of the compressor IPM module 60 by detecting a temperature of the compressor IPM module 60. Circuits for over-voltage protection and over-temperature protection can be constructed by voltage sensors, temperature sensors, resistors, comparators and other electronic components.

Figure 5:
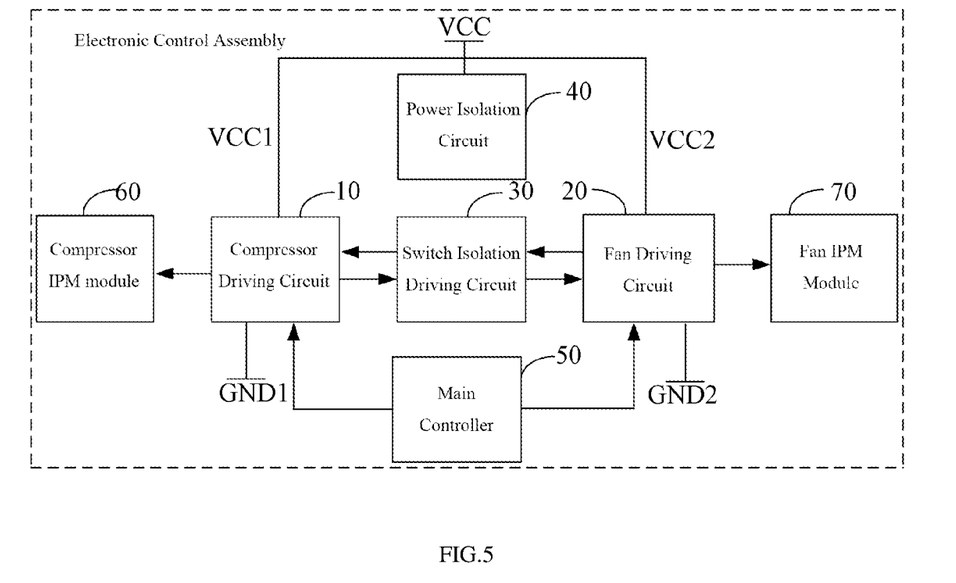
FIG. 5 is a schematic diagram of functional modules of another embodiment of the electric control assembly of the present application.

Referring to FIG. 5, in an embodiment, the electric control assembly further includes a fan failure protection circuit 90, a detection end of the fan failure protection circuit 90 is connected to the fan, and an output end of the fan failure protection circuit 90 is connected to the fan driving circuit 20.

In this embodiment, the fan failure protection circuit 90 can be integrated into the fan IPM module 70, or be integrated into the fan driving circuit 20. Or, electronic components such as current sensors, resistors, comparators, etc. can be used to realize over-current protection of the fan. The fan failure protection circuit 90 can determine whether over-current of the fan occurs by detecting an output current of the fan, so that the fan driving circuit 20 drives the fan to operate according to an over-current protection signal output by the fan failure protection circuit 90. The fan driving circuit 20 can also output a fan failure signal to the compressor driving circuit 10 when the fan failure protection circuit 90 outputs the over-current protection signal, so that the compressor driving circuit 10 can control a working state of the compressor according to the fan failure signal. In the above embodiments, the fan failure protection circuit 90 may also realize over-voltage protection of the compressor by detecting the DC bus voltage, and realize over-temperature protection of the fan IPM module 70 by detecting a temperature of the fan IPM module 70. Over-voltage protection and over-temperature protection circuits can be constructed by electronic components such as voltage sensors, temperature sensors, resistors, comparators, and the like.

Referring to FIG. 5, in one embodiment, the electric control assembly further includes a main controller 50, a compressor IPM module 60, and a fan IPM module 70. Output ends of the main controller 50 are connected to the fan driving circuit 20 and the compressor driving circuit 10, correspondingly, a driving end of the fan driving circuit 20 is connected to the fan IPM module 70, and a driving end of the compressor driving circuit 10 is connected to the compressor IPM module 60.

In this embodiment, the compressor IPM module 60 and the fan IPM module 70 generally integrate a plurality of power switch tubes, such as IGBT tubes and MOS tubes, and a number of the plurality of power switch tubes can be four or six, and the number can be specifically set according to a motor type, driving power, etc. The number of power switch tubes can be six, and the six power switch tubes form a three-phase inverter bridge circuit, which includes three-phase upper bridge arm power switch tubes and three-phase lower bridge arm power switch tubes. In particular, the three-phase upper bridge arm power switch tubes and the three-phase lower bridge arm power switch tubes can be realized by MOS tubes in whole or in part, or by IGBT tubes in whole or in part, or by HEMTs in whole or in part. With this arrangement, it is beneficial to reduce a switching loss of the IPM modules according to characteristics of fast switching speed of the devices made of SiC and GaN materials, thereby saving electric energy and reducing module heating. Further, the IGBT tubes and/or MOSFET tubes can optionally be power tubes made of SiC material. HEMTs can be power tubes made of GaN material.

An air conditioner of the present application includes an electric control assembly as described above. The detailed structure of the electric control assembly can be found in the above embodiments and will not be repeated here. It can be understood that since the above-mentioned electric control assemblies are used in the air conditioner of the present application, the embodiments of the air conditioner of the present application include all the technical solutions of all the embodiments of the above-mentioned electric control assemblies, and the technical effects achieved are exactly the same, and will not be repeated here.

The foregoing are only alternative embodiments of the present application, and are not intended to limit the scope of the present application. All equivalent structural changes made within the concept of the present application, using the contents of the specification and drawings of the present application, or direct/indirect application in other related technical fields are included in the claimed scope of the present application.

What is claimed is:

1. An electric control assembly comprising:
    an electric control board provided with at least two reference grounds;
    a fan driving circuit and a compressor driving circuit both provided on the electric control board, wherein a ground end of the fan driving circuit and a ground end of the compressor driving circuit are connected with the at least two reference grounds of the electric control board in one-to-one correspondence; and
    a switch isolation driving circuit, wherein a first input end of the switch isolation driving circuit is connected with a control end of the compressor driving circuit, and a first output end of the switch isolation driving circuit is connected with a controlled end of the fan driving circuit, a second input end of the switch isolation driving circuit is connected with a control end of the fan driving circuit, a second output end of the switch isolation driving circuit is connected with a feedback end of the compressor driving circuit, the switch isolation driving circuit comprises a first transistor, and a base of the first transistor is connected with the first or second input end of the switch isolation driving circuit;
    wherein the fan driving circuit and the compressor driving circuit perform signal interaction through the switch isolation driving circuit.

2. The electric control assembly of claim 1, further comprising:
    a direct current power supply provided on the electric control board and electrically connected with a power supply end of the fan driving circuit and a power supply end of the compressor driving circuit; and a power isolation circuit provided on the electric control board, wherein an input end of the power isolation circuit is connected with the direct current power supply, and two ground ends of the power isolation circuit are connected with the at least two reference grounds on the electric control board in one-to-one correspondence.

3. The electric control assembly of claim 2, wherein the power isolation circuit comprises a first capacitor, a second capacitor, a first inductor and a second inductor, a first end of the first capacitor is connected to the power supply end of the compressor driving circuit and a first end of the first inductor, and a second end of the first capacitor is connected to one of the at least two reference grounds on the electric control board and a first end of the second inductor; and a first end of the second capacitor is connected to the power supply end of the fan driving circuit and a second end of the first inductor, and a second end of the second capacitor is connected with another of the at least two reference grounds on the electric control board and a second end of the second inductor.

4. The electric control assembly of claim 2, wherein:
the direct current power supply comprises a DC conversion circuit comprising a rectifier bridge, a power filter circuit, and a power factor correction circuit, an input end of the rectifier bridge is for input an AC power supply, and an output end of the rectifier bridge is connected with an input end of the power factor correction circuit and the power filter circuit, and an output end of the power factor correction circuit is connected with a dimming signal output end, and the power factor correction circuit is configured to perform a power factor correction on DC power supply VCC output by the rectifier bridge and output the DC power supply VCC with corrected power factor.

5. The electric control assembly of claim 4 wherein the rectifier bridge comprises a rectifier bridge stack or a rectifier circuit consisting of four independent diodes.

6. The electric control assembly of claim 1, wherein the switch isolation driving circuit comprises:

a first switch isolation branch, wherein an input end of the first switch isolation branch is the first input end of the switch isolation driving circuit, wherein an output end of the first switch isolation branch is the first output end of the switch isolation driving circuit; and a second switch isolation branch, wherein an input end of the second switch isolation branch is the second input end of the switch isolation driving circuit, wherein an output end of the second switch isolation branch is the second output end of the switch isolation driving circuit.

7. The electric control assembly of claim 6, wherein:
the first switch isolation branch comprises the first transistor, a third capacitor, a first resistor, and a second resistor, a first end of the first resistor is the input end of the first switch isolation branch and connected to the base of the first transistor, a collector of the first transistor is the output end of the first switch isolation branch and connected with a power supply end of the fan driving circuit through the second resistor, an emitter of the first transistor is connected with the ground end of the fan driving circuit, and a first end of the third capacitor is connected to the collector of the first transistor, and a second end of the third capacitor is connected to the emitter of the first transistor.

8. The electric control assembly of claim 7, wherein:
the first switch isolation branch further comprises a first optocoupler, a third resistor, a fourth resistor and a fifth resistor, an anode of the first optocoupler is connected with a power supply end of the compressor driving circuit and a first end of the third resistor, a cathode of the first optocoupler is connected with a second end of the second resistor and the third resistor, a collector of the first optocoupler is connected with the power supply end of the fan driving circuit, and an emitter of the first optocoupler is connected with the controlled end of a fan driving circuit via the fourth resistor, and the fifth resistor is connected in series between the emitter of the first optocoupler and the ground end of the fan driving circuit.

9. The electric control assembly of claim 6, wherein:
the second switch isolation branch comprises a second transistor, a fourth capacitor, a sixth resistor, and a seventh resistor, a first end of the sixth resistor is the input end of the second switch isolation branch and connected to a base of the second transistor, a collector of the second transistor is the output end of the second switch isolation branch and connected with a power supply end of the compressor driving circuit through the seventh resistor, and an emitter of the second transistor is connected with the ground end of the compressor driving circuit, and a first end of the fourth capacitor is connected to the collector of the second transistor, and a second end of the fourth capacitor is connected to the collector emitter of the second transistor.

10. The electric control assembly of claim 9, wherein:
the second switch isolation branch further comprises a second optocoupler, an eighth resistor, a ninth resistor and a tenth resistor, an anode of the second optocoupler is connected with a power supply end of the fan driving circuit and a first end of the eighth resistor, a cathode of the second optocoupler is connected with a second end of the eighth resistor and the seventh resistor, a collector of the second optocoupler is connected with the power supply end of the fan driving circuit, and an emitter of the second optocoupler is connected with the feedback end of the compressor driving circuit via the ninth resistor, and the tenth resistor is connected in series between the collector of the second optocoupler and the power supply end of the compressor driving circuit.

11. The electric control assembly of claim 1, further comprising:

a fan failure protection circuit, wherein a detection end of the fan failure protection circuit is connected to a fan, and an output end of the fan failure protection circuit is connected to the fan driving circuit; and/or a compressor failure protection circuit, wherein a detection end of the compressor failure protection circuit is connected to the fan, and an output end of the compressor failure protection circuit is connected to the compressor driving circuit.

12. The electric control assembly of claim 11, wherein the fan failure protection circuit is integrated in the fan driving circuit.

13. The electric control assembly of claim 11, wherein the compressor failure protection circuit is integrated in the compressor driving circuit.

14. The electric control assembly of claim 1, wherein:
the electric control assembly further comprises a main controller, a compressor intelligent power module and a fan intelligent power module,
output ends of the main controller are respectively connected with the fan driving circuit and the compressor driving circuit,
a driving end of the fan driving circuit is connected with the fan intelligent power module, and
a driving end of the compressor driving circuit is connected with the compressor intelligent power module.

15. The electric control assembly of claim 1, wherein the bases of the first and second transistors are connected with the first and second input ends of the switch isolation driving circuit via respective resistors.

16. The electric control assembly of claim 1, wherein emitters of the first and second transistors are connected to collectors of the first and second transistors via respective capacitors.

17. An air conditioner comprising:
an electric control assembly comprising:
an electric control board provided with at least two reference grounds;
a fan driving circuit and a compressor driving circuit both provided on the electric control board, wherein a ground end of the fan driving circuit and a ground end of the compressor driving circuit are connected with the at least two reference grounds of the electric control board in one-to-one correspondence; and
a switch isolation driving circuit, wherein a first input end of the switch isolation driving circuit is connected with a control end of the compressor driving circuit, and a first output end of the switch isolation driving circuit is connected with a controlled end of the fan driving circuit, a second input end of the switch isolation driving circuit is connected with a control end of the fan driving circuit, a second output end of the switch isolation driving circuit is connected with a feedback end of the compressor driving circuit, the switch isolation driving circuit comprises a first transistor, and a base of the first transistor is connected with the first or second input end of the switch isolation driving circuit;
wherein the fan driving circuit and the compressor driving circuit perform signal interaction through the switch isolation driving circuit.

18. The air conditioner of claim 17, wherein the base of the first transistor is connected with the first or second input end of the switch isolation driving circuit via a resistor.

19. The air conditioner of claim 17, wherein an emitter of the first transistor is connected to a collector of the first transistor via a capacitor.

* * * * *